United States Patent [19]

King

[11] Patent Number: 4,974,751
[45] Date of Patent: Dec. 4, 1990

[54] DUAL COFFEE, CREAM OR PRODUCT DISPENSER ASSEMBLY

[76] Inventor: Alan M. King, 465 Cote St. Antoine Rd., Westmount, Quebec, Canada, H3Y 2K1

[21] Appl. No.: 354,853

[22] Filed: May 22, 1989

[51] Int. Cl.⁵ .............................................. B67D 5/52
[52] U.S. Cl. .................................. 222/142; 222/134; 222/237; 222/238
[58] Field of Search ............... 222/138, 134, 135, 145, 222/238, 231, 237, 236, 413, 142; 220/22.1, 22.3

[56] References Cited

U.S. PATENT DOCUMENTS

| | | | |
|---|---|---|---|
| 999,297 | 8/1911 | Carter | 222/142 |
| 2,035,058 | 3/1936 | Feltman | 222/142 |
| 4,193,321 | 3/1980 | King | 74/567 |
| 4,212,415 | 7/1980 | Neely | 222/231 |
| 4,461,405 | 7/1984 | Adamson | 222/231 |
| 4,632,023 | 12/1986 | King | 99/302 P |
| 4,736,875 | 4/1988 | King | 222/641 |
| 4,791,859 | 12/1988 | King | 99/289 D |

FOREIGN PATENT DOCUMENTS 0049315  7/1981  European Pat. Off. ............ 222/238

Primary Examiner—H. Grant Skaggs
Assistant Examiner—Kenneth Noland
Attorney, Agent, or Firm—Hill, Van Santen, Steadman & Simpson

[57] ABSTRACT

A dual hopper coffee cream or product dispenser assembly which has two chambers in which spiral augers are mounted so as to selectively dispense one of two products. Agitators of generally gear-shape configuration are mounted in the hoppers and are driven by the spiral so as to agitate the product for positive and smooth delivery.

1 Claim, 2 Drawing Sheets

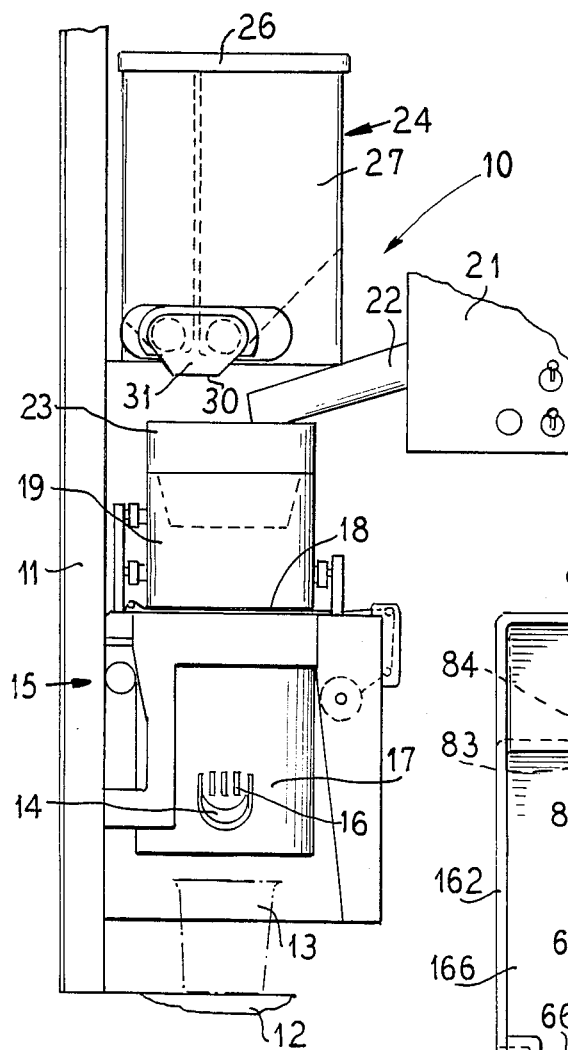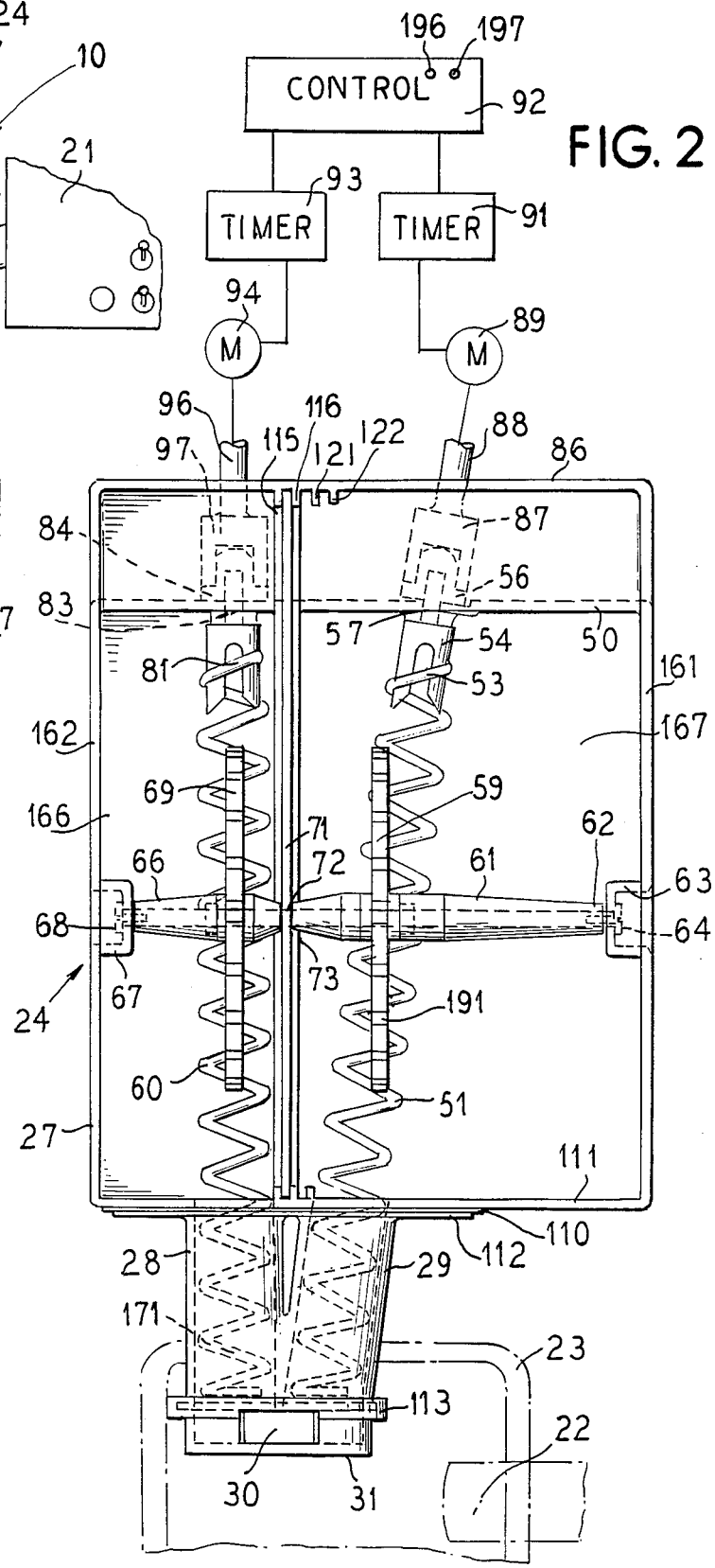

DUAL COFFEE, CREAM OR PRODUCT DISPENSER ASSEMBLY

BACKGROUND OF THE INVENTION

1. Field of the Invention

The present invention relates in general to dispensers such as coffee dispensers which also provide for cream and sugar and in particular to a novel dual coffee, creamer or product dispenser.

2. Description of Related Art

This invention comprises an improvement on coffee brewers which are assigned to the assignee of the present invention and in which the inventor is Alan M. King, the same inventor as the present application. For example, for additional material relating to coffee brewers of the type of which the present invention comprises an improvement refer to U.S. Pat. No. 4,632,023 which issued on Dec. 30, 1986 entitled "Coffee Brewer", U.S. Pat. No. 4,791,859 which issued on Dec. 20, 1988 entitled "Coffee Brewer", U.S. Pat. No. 4,736,875 which issued on Apr. 12, 1988 entitled "Timing Mechanism" and U.S. Pat. No. 4,193,221 which issued on Mar. 18, 1980 entitled "Cam Arrangement".

SUMMARY OF THE INVENTION

The present invention provides a novel dual dispenser from which two separate products can be dispensed such as, for example, regular coffee, powdered creamer and sugar, etc. and decaffeinated coffee, so as to allow a user of the machine to select one of two products. For example, if the user desires regular coffee, he will actuate a control which causes dispensing of regular coffee into the beverage machine and, alternatively, if he desires decaffeinated coffee, he will actuate a control which will dispense decaffeinated coffee.

The present invention provides a dual hopper with a partition mounted therein so as to separate the two products such as regular and decaffeinated coffee and such partition may be replaceable to allow the amount of the product in each of the hoppers to be varied depending on shape of the partition.

The invention allows two agitators to extend forward at an angle so that coffee is dispensed through a single chute. This is a substantial improvement over a machine with two hoppers placed side by side with two augers mounted parallel to each because this requires two chutes to bring the two products to a single point in a brewer. Such prior art structure with two parallel chutes requires that more height be used than is required in this invention. By bringing the discharge ends of the chutes together at an angle greater than zero allows a lower structure to be obtained.

The present machine also provides novel augers made of coil, steel which are positive acting, light and long lasting. However, a solid auger will work equally well.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a front plan view of the machine with the cream and sugar dispensers removed so as to illustrate the invention;

FIG. 2 is a horizontal sectional view illustrating the two augers and the dual hopper;

DESCRIPTION OF THE PREFERRED EMBODIMENTS

Figure 3:
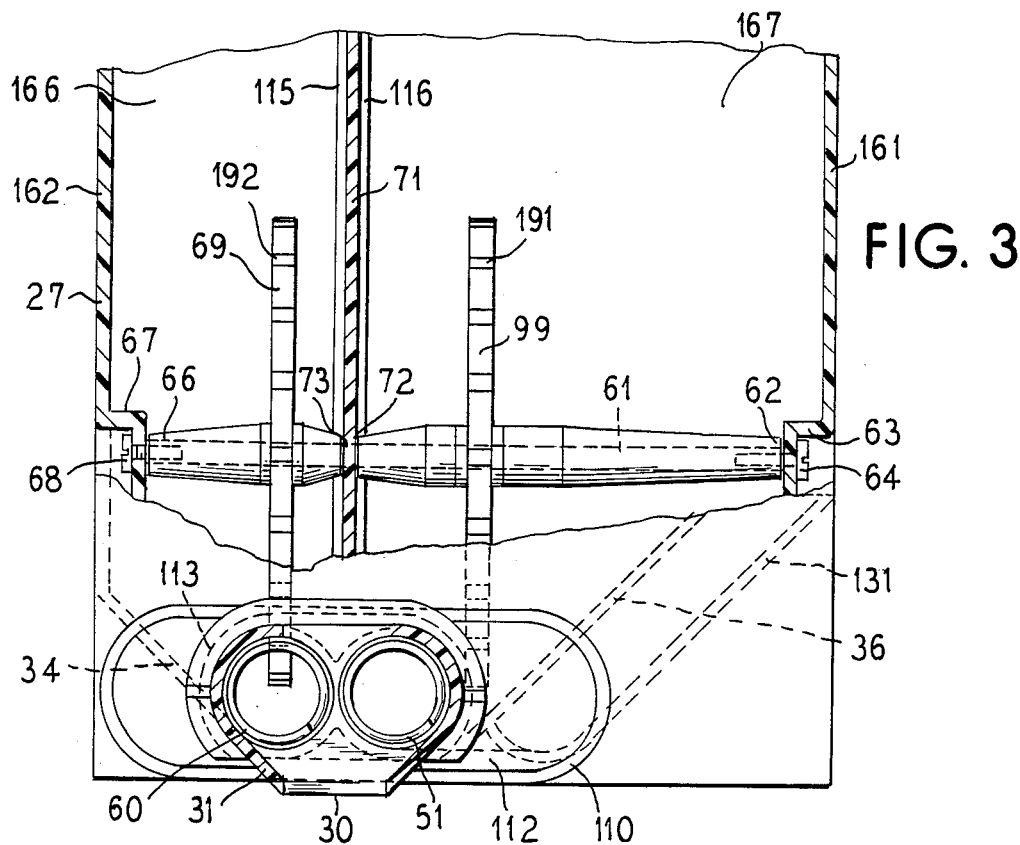
FIG. 3 is a sectional view from the front of the hopper.

FIG. 1 is a front view of the brewer 10 of the invention which comprises a frame member 11 on an upper portion of which is mounted the dual hopper 24 of the invention which contains dual hopper 27 and a cover 26. Discharge chute 31 has a discharge opening 30 for selectively discharging either decaf or regular coffee. When actuated, the hopper 24 discharges regular decaffeinated coffee into an upper portion 23 of a top chamber 19. A hot water supply 21 has a conduit 22 which discharges hot water which passes through the upper chamber 19 and a filter 18 into a coffee brewing lower chamber 17 which is provided with product output slots 16 and a discharge chute 14 for supplying the beverage into a cup 13 that rests on a base 12. The water dispenser, the upper chamber 19, the brewing chamber 17 and the filter details are described in the patents listed above and will not be further described in this application since this invention relates to the dual hopper structure 24.

Figure 4:
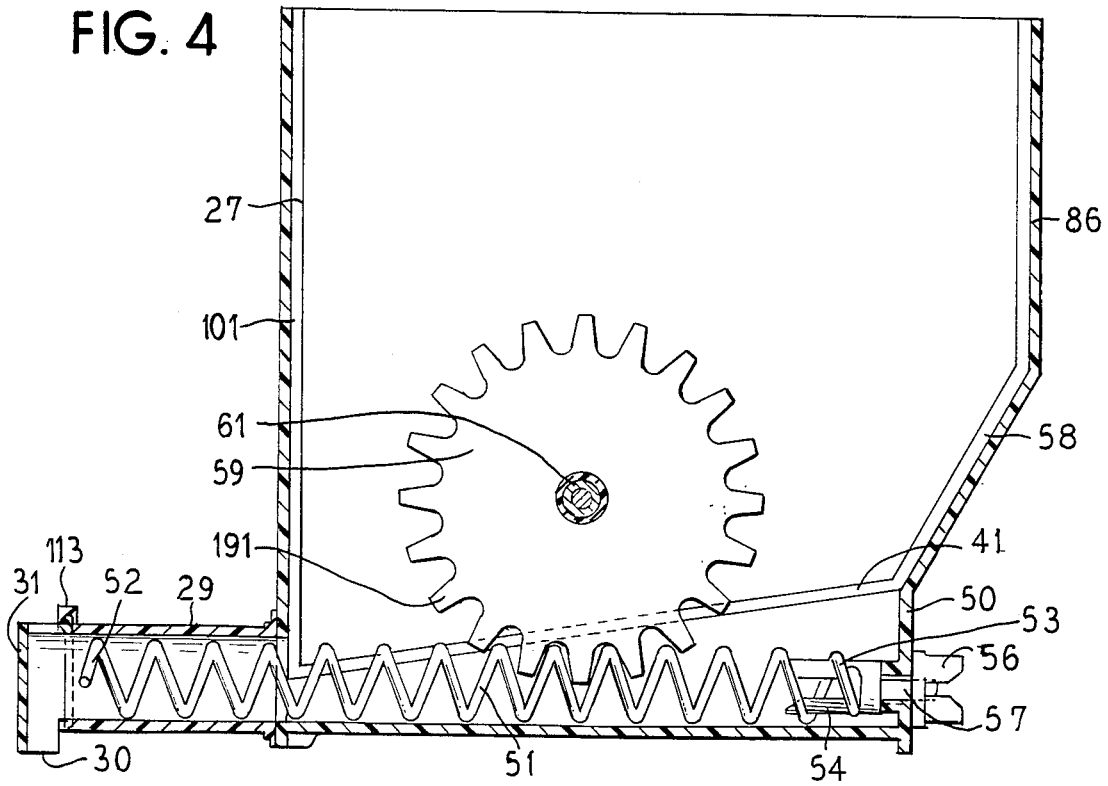
FIG. 4 is a sectional view taken on line IV—IV from FIG. 2.

As shown in FIGS. 2, 3 and 4, the hopper 27 is formed with a bottom 111 and sidewalls 86, 161, 101 and 162. A vertical dividing partition 71 extends between the sidewalls 86 and 101 as illustrated in FIGS. 2 and 3 and is mounted in a groove formed between ribs 115 and 116. The partition 71 can be removed from the hopper 27 and moved to fit between a second pair of ribs 121 and 122 shown in FIG. 2 for the purpose of allowing the two compartments 166 and 167 to be varied in size.

Rotatably mounted in a lower portion of the hopper 27 on opposite sides of the partition 71 are a pair of horizontally extending augers 51 and 60 which are formed of spiral wire as best shown in FIGS. 2, 3 and 4. The rear end 53 of the spiral auger 51 engages a driving lug 54 which is mounted on a shaft 57 rotatably supported in a rear wall 50 of the hopper. The shaft 57 is formed with ears 56 which engage a coupling 87 that is connected to a shaft 88 driven by a motor 89. The motor 89 is actuated by a timer 91 which is connected to a control 92. The front end 52 of the auger 51 is received in a cylindrical guide 29 that end in discharge chute 31.

A second spiral shaped wire auger 60 is mounted in the compartment 166 of the hopper 24 and has a front portion 171 which is rotatably mounted in a hollow cylindrical shaped guide 28. The rear end 81 of the auger 60 engages a driving member 82 mounted on the shaft 83 which is rotatably supported in the wall 50. The shaft 83 carries ears 84 which mate with a driving lug 97 mounted on a shaft 96 of a motor 94. The motor 94 is controllable with a timer 93 which is connected to the control 92. Gear-shape agitators 59 and 69 are respectively mounted in the hopper portions 166 and 167 on opposite sides of the partition 71. A shaft 61 has opposite ends 62 and 66 which are connected to the walls 161 and 162. The wall 161 has an indentation 63 through which a screw 64 rotatably passes and is connected to the end 62 of shaft 61. The wall 162 has an indentation 67 through which a screw 68 rotatably passes and its inner end is attached to the end 66 of shaft 61. A portion 73 of shaft 61 passes through an opening 72 in the partition 71 as shown in FIGS. 2 and 3, for example.

As best shown in FIG. 4, the agitators 59 and 69 are each provided with teeth are each rotatably supported on shaft 61 and 91 and 192, respectively, and the teeth 191 and 192 respectively engage the spirals of the augers 51 and 60. For example, as shown in FIG. 4, the auger 51 engages the teeth 191 of the agitator 59 such that as the auger 51 is rotated, the agitator 59 will be rotated because the spirals of the auger are in engagement with the teeth 191 so as to rotate the agitator 59 on the shaft 61. It is to be realized that the agitator 69 has teeth 192 which engage the spirals of the auger 60 such that the agitator 69 is rotated when the auger 60 is rotated. When the augers 51 or 60 are actuated, the respective agitators 59 and 69 will be rotated so as to agitate the product such as coffee in the upper portions 166 and 167 so as to cause them to pass downwardly to the bottom of the hopper portions so that they will be readily dispensed by the augers 51 and 60.

In operation, when a customer actuates one of the selector control buttons such as 196 and 197 on the control 92 so as to select, for example, regular coffee, the control 92 will energize the timer 91 to drive the motor 89 to drive the auger 51 so as to move regular coffee into the hollow cylindrical portion 29 where it drops through the opening 30 of the chute 31 into the upper chamber 19 of the coffee maker. Simultaneously, water is supplied from the water supply 21 through conduit 22 and the coffee brewer brews a cup of coffee in the manner discussed in the above listed patents and the coffee is dispensed from the openings 16 and chute 14 into the cup 13. The amount of coffee dispensed depends on the time determined by the timer 91.

If another user desires decaffeinated coffee he would actuate the appropriate control button of the control 92 to energize the timer 93 which drives the motor 94 which drives the auger 60 to dispense decaffeinated coffee through the opening 30 of the chute 31 into the upper chamber 19 of the coffee brewer which would brew decaffeinated coffee.

It is seen that this invention provides a novel dual chamber coffee brewer and although it has been described with respect to preferred embodiments, it is not to be so limited as changes and modifications can be made which are within the full intended scope as defined by the appended claims.

I claim as my invention:

1. A dual product dispenser for a brewer comprising, a dual hopper formed with first and second side-by-side compartments, a first hollow extension extending from said first compartment, a second hollow extension extending from said second compartment and at an angle greater than zero degrees to said first hollow extention, a first auger rotably mounted in said first compartment with a first end which extends into said first hollow extension, a second auger rotably mounted in said second compartment with a first end which extends into said second hollow extension, a first driving means connected to drive said first auger, a second driving means connected to drive said second auger, a discharge chute connected to said first and second hollow extensions, an agitator gear rotably mounted in said first compartment, and in engagement with said first auger so that when said first auger is rotated said first agitator gear rotates and a second agitator gear rotably mounted in said second compartment and in engagement with said second auger so that when said second auger rotates said second agitator gear rotates, and wherein said first and second agitator gears are rotably mounted on a support shaft which extends into said first and second compartments, and wherein said dual hopper is divided into said first and second compartments by a partition wall which is movably attached to the walls of dual hopper, and a portion of said support shaft passes through an opening formed in the partition so as to be received in multiple grooves at the end of said compartments so that the volume of each of said compartments may be varied.

* * * * *